United States Patent
Chang et al.

(10) Patent No.: US 8,670,415 B2
(45) Date of Patent: Mar. 11, 2014

(54) APPARATUS AND METHOD FOR PERFORMING HANDOFF IN A COMMUNICATION SYSTEM

(75) Inventors: Young-Bin Chang, Hwaseong-si (KR); Eun-Taek Lim, Suwon-si (KR); Jung-Min Ro, Seoul (KR); Jae-Hyuk Jang, Suwon-si (KR); Dong-Seek Park, Yongin-si (KR); Young-Kwon Cho, Suwon-si (KR); Seung-Hoon Park, Seoul (KR); Joon-Young Choi, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 1652 days.

(21) Appl. No.: 11/500,222

(22) Filed: Aug. 7, 2006

(65) Prior Publication Data

US 2007/0032237 A1 Feb. 8, 2007

(30) Foreign Application Priority Data

Aug. 5, 2005 (KR) .................... 10-2005-0071971
Aug. 5, 2005 (KR) .................... 10-2005-0071973

(51) Int. Cl.
*H04W 4/00* (2009.01)

(52) U.S. Cl.
USPC ........... 370/332; 370/331; 370/466; 455/436; 455/439

(58) Field of Classification Search
USPC .................... 370/332, 331, 466; 455/436, 439
See application file for complete search history.

(56) References Cited

U.S. PATENT DOCUMENTS

| | | | | |
|---|---|---|---|---|
| 5,970,407 | A | * | 10/1999 | Brunner et al. ............... 455/437 |
| 6,112,093 | A | * | 8/2000 | Nordlund ...................... 455/450 |
| 6,151,502 | A | * | 11/2000 | Padovani et al. .............. 455/442 |
| 6,278,879 | B1 | * | 8/2001 | Western et al. ............... 455/436 |
| 6,788,952 | B1 | * | 9/2004 | Jokimies et al. .............. 455/525 |
| 6,804,532 | B1 | | 10/2004 | Moon et al. |
| 6,879,600 | B1 | * | 4/2005 | Jones et al. ................... 370/466 |
| 2002/0197992 | A1 | | 12/2002 | Nizri et al. |
| 2004/0157610 | A1 | | 8/2004 | Black et al. |
| 2005/0239425 | A1 | * | 10/2005 | Wallace et al. ............. 455/194.2 |

FOREIGN PATENT DOCUMENTS

| | | |
|---|---|---|
| DE | 198 19 423 A1 | 4/1998 |
| KR | 1020050042666 | 5/2005 |
| KR | 1020050120476 | 12/2005 |
| KR | 1020060040127 | 5/2006 |
| KR | 1020060040412 | 5/2006 |
| KR | 1020070002532 | 1/2007 |
| WO | WO 2004/073348 A1 | 8/2004 |

* cited by examiner

*Primary Examiner* — Olumide T Ajibade Akonai
*Assistant Examiner* — Michael Irace
(74) *Attorney, Agent, or Firm* — The Farrell Law Firm, P.C.

(57) ABSTRACT

A method is provided for performing handoff in a communication system including a serving base station (BS) in communication with a mobile station (MS), at least one neighbor BS using a communication scheme different from a communication scheme of the serving BS, and the MS capable of communicating with the neighbor BS. The method includes compensating a signal strength of one of the serving BS and the neighbor BS, received at the MS, such that handoff decision is possible, and determining whether to perform a handoff of the MS, using the compensated signal strengths.

17 Claims, 14 Drawing Sheets

APPARATUS AND METHOD FOR PERFORMING HANDOFF IN A COMMUNICATION SYSTEM

PRIORITY

This application claims the benefit under 35 U.S.C. §119 (a) of an application entitled "Apparatus and Method for Performing Handoff in a Communication System" filed in the Korean Intellectual Property Office on Aug. 5, 2005 and assigned Ser. No. 2005-71973, and an application entitled "Apparatus and Method for Performing Handoff in a Communication System" filed in the Korean Intellectual Property Office on Aug. 5, 2005 and assigned Ser. No. 2005-71971, the entire contents of both of which are incorporated herein by reference.

BACKGROUND OF THE INVENTION

1. Field of the Invention

The present invention relates generally to a communication system, and in particular, to an apparatus and method for performing handoff in a heterogeneous communication system in which different communication schemes coexist.

2. Description of the Related Art

In the $4^{th}$ generation (4G) communication system, extensive research is being conducted to provide high-speed services having various Qualities of Service (QoS) to users. Particularly, extensive research is being conducted to support high-speed services capable of guaranteeing mobility and QoS for a Broadband Wireless Access (BWA) system such as a wireless Local Area Network (LAN) system and a wireless Metropolitan Area Network (MAN) system.

In addition, the current communication systems, i.e. $3^{rd}$ generation (3G) communication system and $3.5^{th}$ (3.5G) communication system, are evolving, proposing new communication schemes. The proposed communication schemes include High Speed Downlink Packet Access (HSDPA), Evolution-Data Only (EV-DO), Evolution-Data and Voice (EV-DV), Institute of Electrical and Electronics Engineers (IEEE) 802.16, IEEE 802.11, and Digital Multimedia Broadcasting (DMB).

Therefore, the communication systems now under development may adopt the foregoing advanced communication standards, or may employ new innovative technologies replacing the above communication schemes. However, due to the advent of the various communication schemes mentioned above, the next generation communication system will evolve into a heterogeneous communication system in which various communication schemes coexist.

The communication system should take mobility of Mobile Stations (MSs) into consideration, and provide handoff so that the MS may maintain a call no matter where the MS moves.

FIG. 1 is a graph illustrating intercell pilot signal strength for handoff in a conventional communication system.

Referring to FIG. 1, a conventional handoff will be described for an Interim Standard-95 (IS-95) (or cdmaOne) communication system using Code Division Multiple Access (CDMA), by way of example.

A Base Station (BS) currently providing a service to a corresponding MS, i.e. a serving BS, will be called a BS A. The MS measures currently received pilot signals, and the measured pilot signals are pilot signals of the BS A, a BS B and a BS C. After measuring the pilot signal strengths, the MS periodically reports the measured pilot signal strengths to the BS A.

The BS A determines whether to perform handoff of the MS, depending on the pilot signal strengths received from the MS. The pilot signal strengths can be expressed in dBm or dB, and indicate Received Signal Strength (RSS) or Signal to Interference and Noise Ratio (SINR), which reflects the strength of the radio signals.

The graph of FIG. 1 shows strengths of pilot signals that the MS receives from a plurality of BSs, i.e. the BS A, the BS B and the BS C, with the passage of time. In the graph, the vertical axis represents signal the pilot signal strengths, and the horizontal axis represents time.

In the IS-95 communication system, the MS classifies BSs into an aggregate according to strengths of the received pilot signals, and manages the aggregate. The aggregate managed in the MS is called a 'set'.

The set is roughly divided into two types, and the MS classifies the BSs into a candidate set and an active set. Of the BSs, a BS whose pilot signal strength is greater than a first threshold T_ADD is classified as an active set, and a BS whose pilot signal strength is less than a second threshold T_DROP is excepted as the active set.

It will be assumed in FIG. 1 that the MS now in communication with the BS A leaves the service coverage area of the BS A and moves to service coverage area of the BS B or the BS C, attempting handoff. The above handoff method is called soft handoff, and the number of active sets of the MS is limited to, for example, is 2.

While the pilot signal strength of the BS A measured by the MS decreases with time, the pilot signal strengths of the BS B and the BS C increase slightly with time.

A handoff operation of the MS will now be described along with the passage of time. First, at time 'a', the MS, since it is communicating with the BS A, classifies the BS A as a serving BS, and at the same time, classifies the BS A as an active set. At this moment, the pilot signal strengths of the BS B and the BS C are both less than the first threshold T_ADD. Therefore, the MS classifies the BS B and the BS C as a candidate set.

Second, at the time 'a', the pilot signal strength of the BS B is greater than the first threshold T_ADD. Therefore, the MS classifies the BS B as an active set, and the MS communicates not only with the BS A but also with the BS B. In addition, the MS classifies the BS C as a candidate set.

Third, at time 'b', the pilot signal strength of the BS C is greater than the first threshold T_ADD. However, because the number of active sets is limited to 2, the MS compares the pilot signal strengths of the BS B and the BS C. At this time, the pilot signal strength of the BS C is less than the pilot signal strength of the BS B. Therefore, the BS C is classified as a candidate set, even though it can be classified as an active set.

Fourth, at time 'c', the MS compares the pilot signal strength of the BS A with the pilot signal strength of the BS B, and outputs a comparison result $T\_COMP_{AB}$. If the comparison result $T\_COMP_{AB}$ is continuously greater than a predetermined threshold T_COMP for a predetermined set time, the MS changes the BS B as a new serving BS.

Fifth, at time 'd', the MS compares the pilot signal strength of the BS A and the pilot signal strength of the BS C, and outputs a comparison result $T\_COMP_{AC}$. If the comparison result $T\_COMP_{AC}$ is continuously greater than the threshold T_COMP for a predetermined set time, the MS changes the BS C as an active set. Therefore, the MS classifies the BS A as a candidate set. At this moment, the MS stops communication with the BS A, and starts communication with the BS C. If the number of active sets is greater than or equal to 3, the MS can communicate with all of the BS A, the BS B, and the BS C.

Sixth, at time 'e', if the BS A is an active set, because the pilot signal strength of the BS A is less than the second threshold T_DROP, the MS classifies the BS A as a candidate set.

Hard handoff is similar to the soft handoff in operation. In the hard handoff though, the BS simply performs a preparation operation for handoff instead of becoming an active set, and at same time, communicating with the MS. As a result, in the hard handoff, inter-BS communication of the MS is performed through one BS.

However, the current communication system, as described above, will evolve into the heterogeneous communication system in which at least two different communication schemes coexist, rather than single (one) communication system using one communication scheme. Even in the heterogeneous communication system, the mobility of MSs should be taken into consideration. Further, handoff for providing seamless communication service should be taken into account due to the movement of the MSs.

FIG. 2 is a diagram illustrating pilot signal strengths received at an MS from BSs using different communication schemes.

Referring to FIG. 2, service coverage of a BS A and service coverage of a BS B, i.e. a cell A 200 and a cell B 250, are shown. Herein, the BS A and the BS are communication systems using different communication schemes.

Assuming that an MS 201 supports both the communication schemes used in the BS A and the BS B, there is a possible scenario in which the MS 201 located in the service coverage area of the BS A moves to the coverage area of the BS B, requiring it to change its serving BS.

The BS A and the BS B use different communication schemes. Therefore, if the MS 201 measures the pilot signal strengths in the existing method of FIG. 1, strengths of the pilot signals transmitted by the BSs may not be consistent due to the discrepancy of the communication schemes.

That is, when the MS performs handoff between different communication systems as shown in FIG. 2, if the minimum value of the pilot signal strength for communication with the BS A is defined as 'min a', and the minimum value of the pilot signal strength for communication with the BS B is defined as 'min b', the MS cannot use a threshold of an absolute pilot signal strength for classifying BSs, due to a difference between the two minimum values. In addition, when the pilot signal strengths of the two BSs both exceed the minimum values 'min a' and 'min b' for communication, at the boundary of the cell A and the cell B, the MS cannot determine which BS's signal is preferable for handoff decision. That is, the MS cannot determine the difference between the pilot signal strengths in the method of FIG. 1, to perform handoff. It is also impossible to use such handoff parameters as the first threshold T_ADD, the second threshold T_DROP, and the reference value T_COMP of FIG. 1.

In conclusion, the conventional technology cannot support appropriate handoff due to the movement of an MS between heterogeneous communication system. Accordingly, there is a need for a handoff method for providing a seamless communication service to an MS in a heterogeneous communication system.

SUMMARY OF THE INVENTION

It is, therefore, an aspect of the present invention to provide an apparatus and method for performing handoff in a communication system.

It is another aspect of the present invention to provide a handoff apparatus and method for supporting the mobility of an MS in a heterogeneous communication system.

It is further another aspect of the present invention to provide an apparatus and method for providing a seamless communication service to an MS in a heterogeneous communication system.

It is yet another aspect of the present invention to provide an apparatus and method for constructing a handoff controller and performing handoff using the handoff controller in a heterogeneous communication system.

According to the present invention, there is provided a method for performing handoff in a communication system including a serving base station (BS) in communication with a mobile station (MS), at least one neighbor BS using a communication scheme different from a communication scheme of the serving BS, and the MS capable of communicating with the neighbor BS. The method includes compensating signal strength of at least one of the serving BS and the neighbor BS, received at the MS, such that a handoff decision is possible, and determining whether to perform a handoff of the MS, using the compensated signal strength.

According to the present invention, there is provided an apparatus for performing handoff in a communication system including a serving base station (BS) in communication with a mobile station (MS), at least one neighbor BS using a communication scheme different from a communication scheme of the serving BS, and the MS capable of communicating with the neighbor BS. The apparatus includes a handoff controller for compensating signal strength of at least one of the serving BS and the neighbor BS, received at the MS, such that a handoff decision is possible, and determining whether to perform a handoff of the MS, using the compensated signal strength.

BRIEF DESCRIPTION OF THE DRAWINGS

The above and other aspects, features and advantages of the present invention will become more apparent from the following detailed description when taken in conjunction with the accompanying drawings in which.

DETAILED DESCRIPTION OF THE PREFERRED EMBODIMENTS

Figure 1:
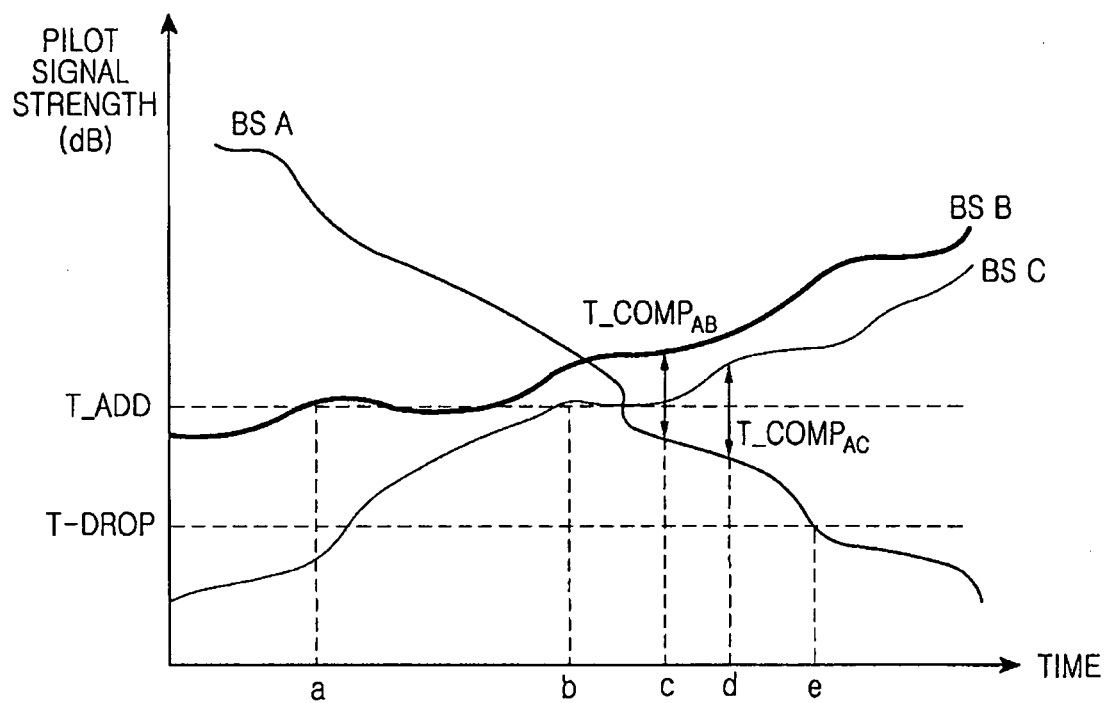
FIG. 1 is a graph illustrating intercell pilot signal strength for handoff in a general communication system.

Preferred embodiments of the present invention will now be described in detail with reference to the annexed drawings. In the following description, a detailed description of known functions and configurations incorporated herein has been omitted for the sake of clarity and conciseness.

The present invention proposes a handoff apparatus and method in a communication system using at least two different communication schemes, i.e. in a heterogeneous communication system. A communication system including transmitters, i.e. Base Stations (BSs) employing different communication schemes, proposes an apparatus and method for measuring strengths of signals received at a receiver, i.e. a Mobile Station (MS), compensates the measured signal strengths such that it is possible to determine whether to perform handoff of the MS, determines handoff depending on the compensated signal strengths, and allows the MS to perform handoff according to the handoff decision.

Herein, the terms "handoff" and "handover" are used interchangeably.

For a description of the present invention, a handoff decision method according to the present invention will first be described. For the handoff decision, the present invention compensates a signal received from a BS using an offset or a scaling factor, and determines whether to perform handoff depending on the compensated signal. The handoff decision will be described in detail below.

The present invention is premised on the handoff in a heterogeneous communication system, and it is assumed that the heterogeneous communication system includes a BS using at least two different communication schemes, and an MS that can support all of the communication schemes used in the heterogeneous communication system. Therefore, the MS can support not only the existing communication schemes, but also every communication scheme used in the next generation communication system. For example, the MS can support at least two of the communication schemes including High Speed Downlink Packet Access (HSDPA), Evolution-Data Only (EV-DO), Evolution-Data and Voice (EV-DV), Institute of Electrical and Electronics Engineers (IEEE) 802.16, IEEE 802.11, and Digital Multimedia Broadcasting (DMB).

The handoff decision can be performed by a handoff controller, and the handoff controller can be separately constructed, or can be constructed in a BS or an MS.

For the handoff decision, the handoff controller measures strengths of signals that the MS receives from BSs, or receives measured signal strengths. If the function of the handoff controller is performed by an MS, the MS measures strengths of the signals received from the BSs, and performs handoff using the measured signal strengths. However, when the handoff controller is included in a device other than the MS, the handoff controller receives the signal strengths of the BSs measured by the MS, and performs handoff using the received signal strengths.

Herein, the signal the MS receives can be a pilot signal or a preamble signal. For measurement of the received signal strengths, the handoff controller can measure power values of the signals received at the MS. The power values can be measured using Received Signal Strength (RSS) or Signal to Interference and Noise Ratio (SINR).

Generally, the strength of a signal received at the MS from the BS decreases as a distance from the BS increases. When the signal strength is expressed in dB(m), modeling of the BS signal received at the MS is possible. A propagation path loss determined by modeling the signal strength can be expressed in Equation (1) as $$\text{Path loss (dB)} = -10 \times \log(G_t G_r \lambda^2 / (4\pi d)^2) \quad (1)$$

Figure 2:
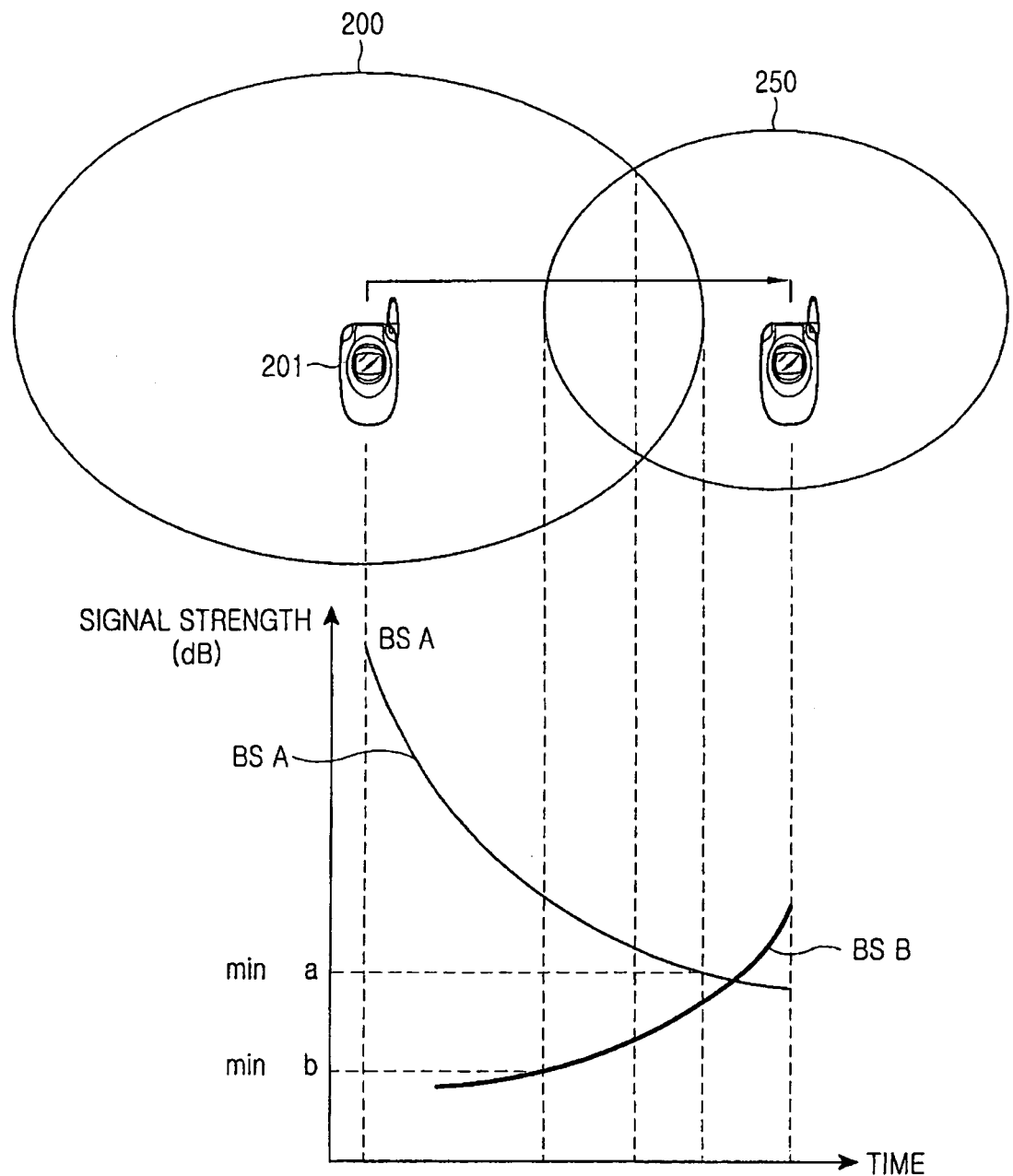
FIG. 2 is a diagram illustrating pilot signal strengths received at an MS from BSs using different communication schemes.

In Equation (1), $G_t$ denotes a gain of a transmission antenna, $G_r$ denotes a gain of a reception antenna, $\lambda$ denotes a wavelength at the center frequency, and 'd' denotes a distance between transmitter and a receiver. When the strength of the signal received at the MS from the BS is modeled using Equation (1), there is no need to consider the effect of long-term fading and instant short-term fading represented by log-normal shadowing, which is a random component. The graph of FIG. 2 can be acquired by modeling the signal strength using Equation (1).

In addition, with the use of Equation (1), a theoretical RSS value of the signal received at the MS can be found in accordance with Equation (2), as $$RSS(\text{dBm}) = \text{Path loss} + \text{Transmit\_Power}_{BS} \quad (2)$$

In Equation (2), Transmit_Power$_{BS}$ denotes a transmission power value of a BS signal. The gains of transmission/reception antennas, the center frequency, and the cell radius are predetermined according to the communication network standard. The RSS value of the signal received at the MS becomes a function associated with the distance between the MS and the BS. Graphing this relationship follows the path loss formula of Equation (1), forming a pattern of a logarithm function associated with the distance between the MS and the BS. In addition, even for the SINR, which is another measured pilot signal strength value, a noise value in the wireless channel is considered, but it also follows the path loss shown in Equation (1), like the RSS. Therefore, even for the SINR, a pattern of the logarithm function associated with the distance between the MS and the BS is formed.

Assuming that the signal received at the MS from the BS is a pilot signal, the pilot signal strength can be expressed in dB. If the pilot signal strength is defined as Pilot_Strength$_{BS}$, it can be expressed in Equation (3) as $$\text{Pilot\_Strength}_{BS}(\text{dB}) = -10 \log_{10}(G_t G_r \lambda^2 / (4\pi d)^2) + \text{Transmit\_Power}_{BS} \quad (3)$$

Next, a description will be made of method for compensating signal strengths such that it is possible to determine whether to perform handoff depending on signal strengths of BSs received at the MS when the handoff is performed in the heterogeneous communication system.

Figure 3A:
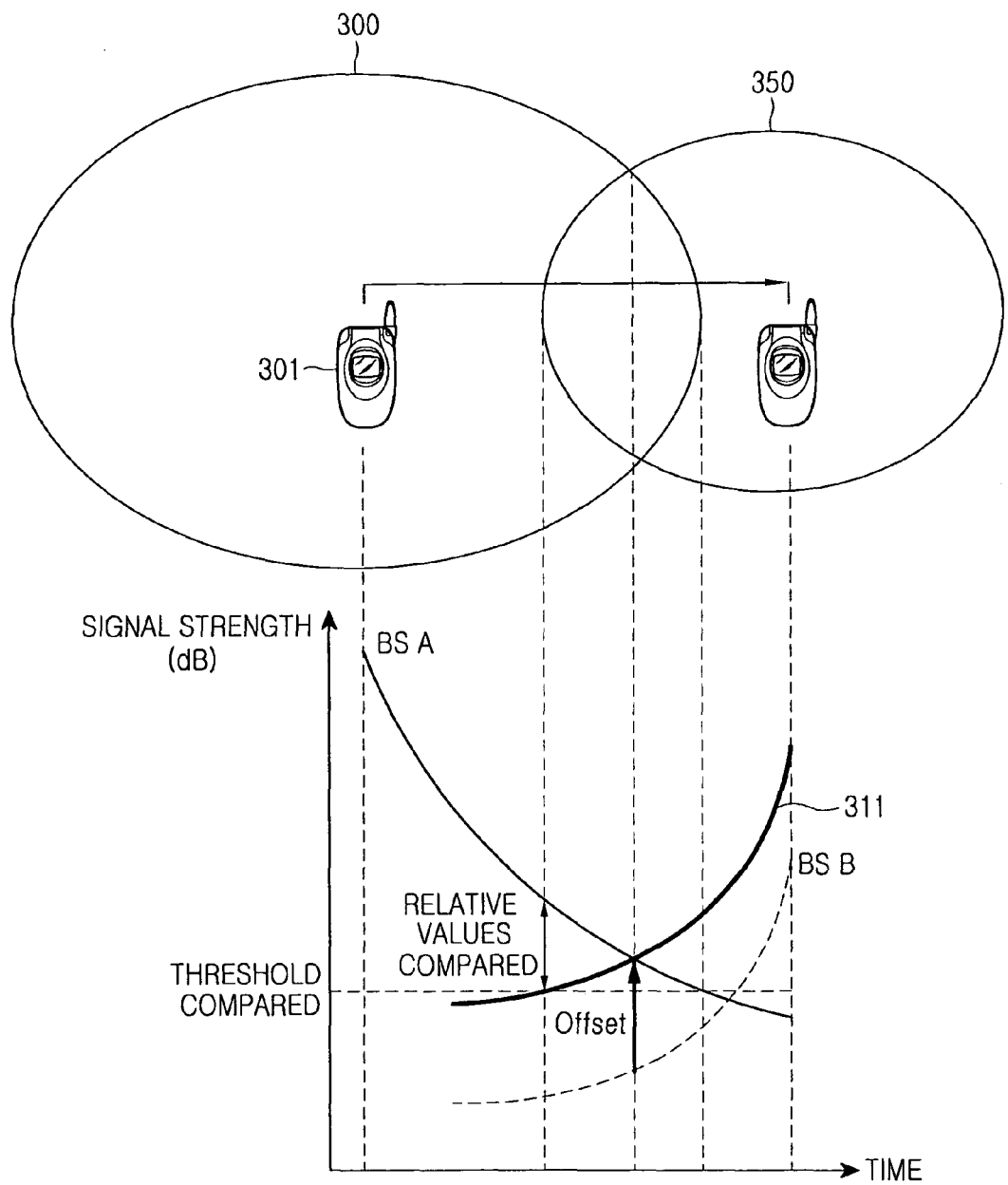
FIGS. 3A and 3B are diagrams illustrating a method for compensating signal strengths of BSs received at an MS using an offset according to the present invention.
Figure 3B:
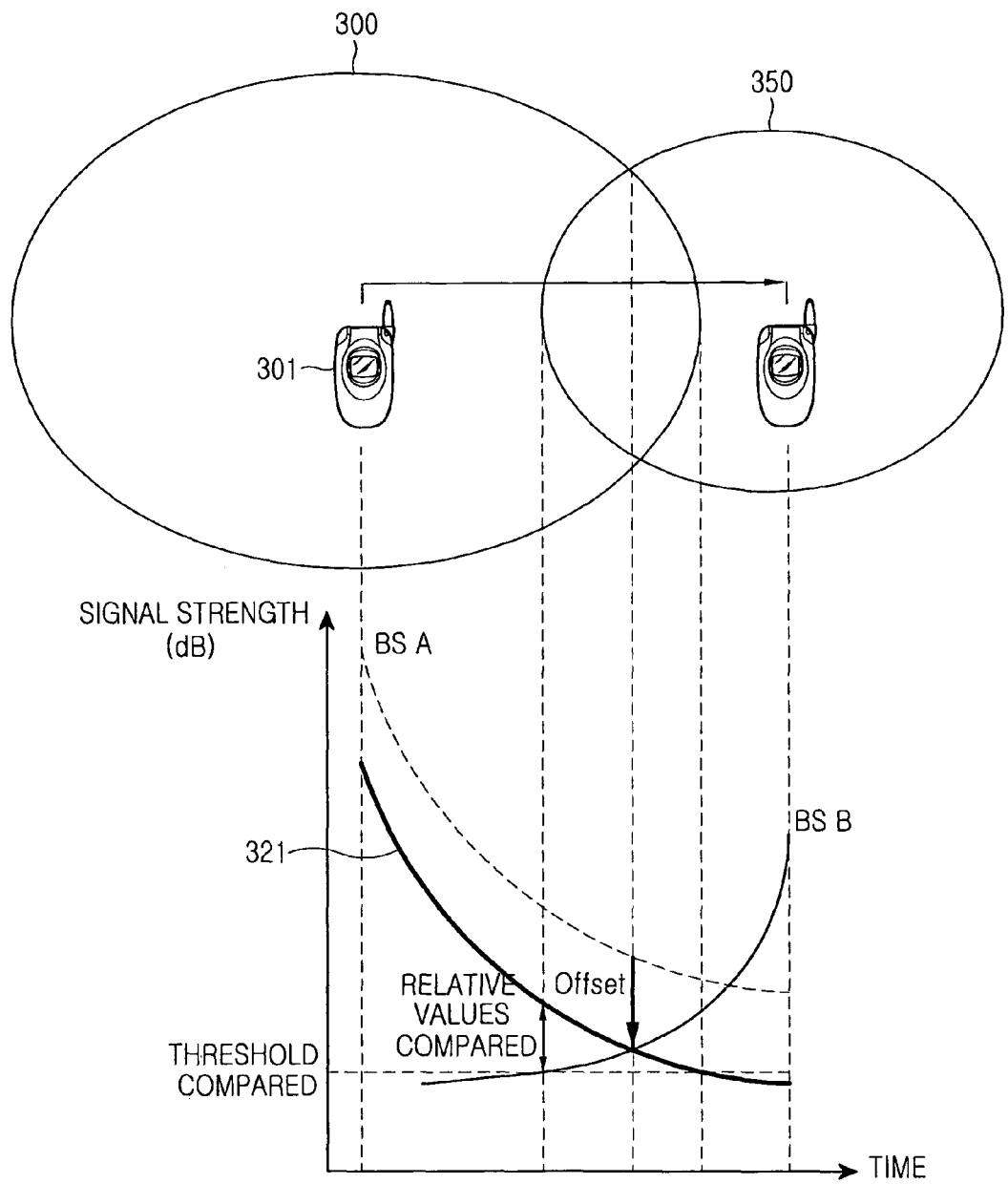

FIGS. 3A and 3B are diagrams illustrating a method for compensating signal strengths of BSs received at an MS using an offset according to the present invention.

Referring to FIG. 3A, cells of a BS A and a BS B using different communication schemes are shown. Specifically, a cell A 300, which is service coverage area of the BS A, and a cell B 350, which is service coverage area of the BS B, are shown. In FIG. 3A, an MS 301 moves from the cell A 300 to the cell B 350, and the signal strengths received at the MS 301 are shown over time.

The MS 301, as its location changes, should occasionally change a serving BS, i.e. should perform handoff. However, because the BS A and the BS B use different communication schemes, the MS 301 cannot apply the handoff method used in the existing single communication system. Therefore, the present invention compensates the signal strengths received from the BSs using an offset in order to determine whether to perform handoff of the MS 301.

A method for determining whether to perform handoff by applying an offset to the signal strength of the BS B in order to determine handoff between heterogeneous communication systems is shown in FIG. 3A. The signal strengths of the BS A using a first communication scheme and the BS B using a second communication scheme are shown. Signal strength 311 determined by compensating the signal strength of the BS B using an offset is shown for comparison between signal strengths of BSs in the heterogeneous communication system.

Referring to FIG. 3B, the handoff method compensates the signal strength of the BS A, compared with the handoff method of FIG. 3A that compensates the signal of the BS B. For convenience, the details described in connection with FIG. 3A will be omitted herein. FIG. 3B, unlike FIG. 3A, shows a method for determining whether to perform handoff after applying an offset to the signal strength of the BS A in order to determine whether to perform handoff between heterogeneous communication systems. The signal strengths of the BS A using a first communication scheme and the BS B using a second communication scheme are shown. Signal strength 321 determined by compensating the signal strength of the BS A using an offset is shown for comparison between signal strengths of BSs in the heterogeneous communication system.

With the use of the signal strengths 311 and 321 compensated in the methods of FIGS. 3A and 3B, respectively, it is possible to determine whether to perform handoff of the MS 301.

Generally, if the center frequency is determined in one system, $G_t$, $G_r$, $\lambda$ and Transmit_Power$_{BS}$ in Equation (3) all have a constant value, and Equation (3) is determined according to a distance value 'd' between the transmitter and the receiver. Therefore, a slope of the graph of the signal strength received at the MS 301 is not changed, and has the pattern of the logarithm function shown in FIGS. 3A and 3B. A formula for compensating only the difference between relative levels of the signals is defined in Equation (4) as $$\text{Compensated\_Pilot\_Strength}_{BS} = \text{Pilot\_Strength}_{BS} + \text{Offset}_{BS_{SYS}} \quad (4)$$

In Equation (4), Pilot_Strength$_{BS}$ denotes signal strength that the MS 301 received from a particular BS, and Offset$_{BS_{SYS}}$ denotes an offset added to the Pilot_Strength$_{BS}$, for signal strength compensation. Therefore, Compensated_Pilot_Strength$_{BS}$ denotes compensated signal strength of the particular BS.

The particular BS of FIG. 3A is the BS B, and the particular BS of FIG. 3B is the BS A. Although the handoff methods of FIGS. 3A and 3B each have compensated only one BS signal strength, they can also determine whether to perform handoff by compensating the signal strengths of both the BS A and the BS B using Equation (4).

Therefore, the handoff methods of FIGS. 3A and 3B compensate signal strengths of the BS B and the BS A, and determine whether to perform handoff between heterogeneous communication systems using the compensated signal strengths 311 and 321, respectively. With the use of the compensated signal strengths, it is possible to perform handoff using the handoff decision method used in the existing single communication system.

The offset has a real value, if it is applied to the signal strength of the BS, which is to be subject to signal strength compensation. The offset allows compensation of signal strengths of the BSs using different communication schemes, and a determination of whether to perform handoff between the BSs using different communication schemes. The offset can be determined using a difference between a reference signal strength set for signal strength compensation between the BSs using different communication schemes, and the signal strength of the BS, which is to be subject to signal strength compensation. The reference signal strength, as shown in FIGS. 3A and 3B, can be set as the signal strength of the serving BS or the neighbor BS. A predetermined reference signal strength can be set as the reference signal strength. In addition, the offset can be determined using the value measured through handoff simulation or actual experiments. The offset is a factor that can be set in any manner according to the communication scheme in order to determine whether to perform handoff of the MS, and can be determined using the parameters shown in Equation (1).

Figure 4A:
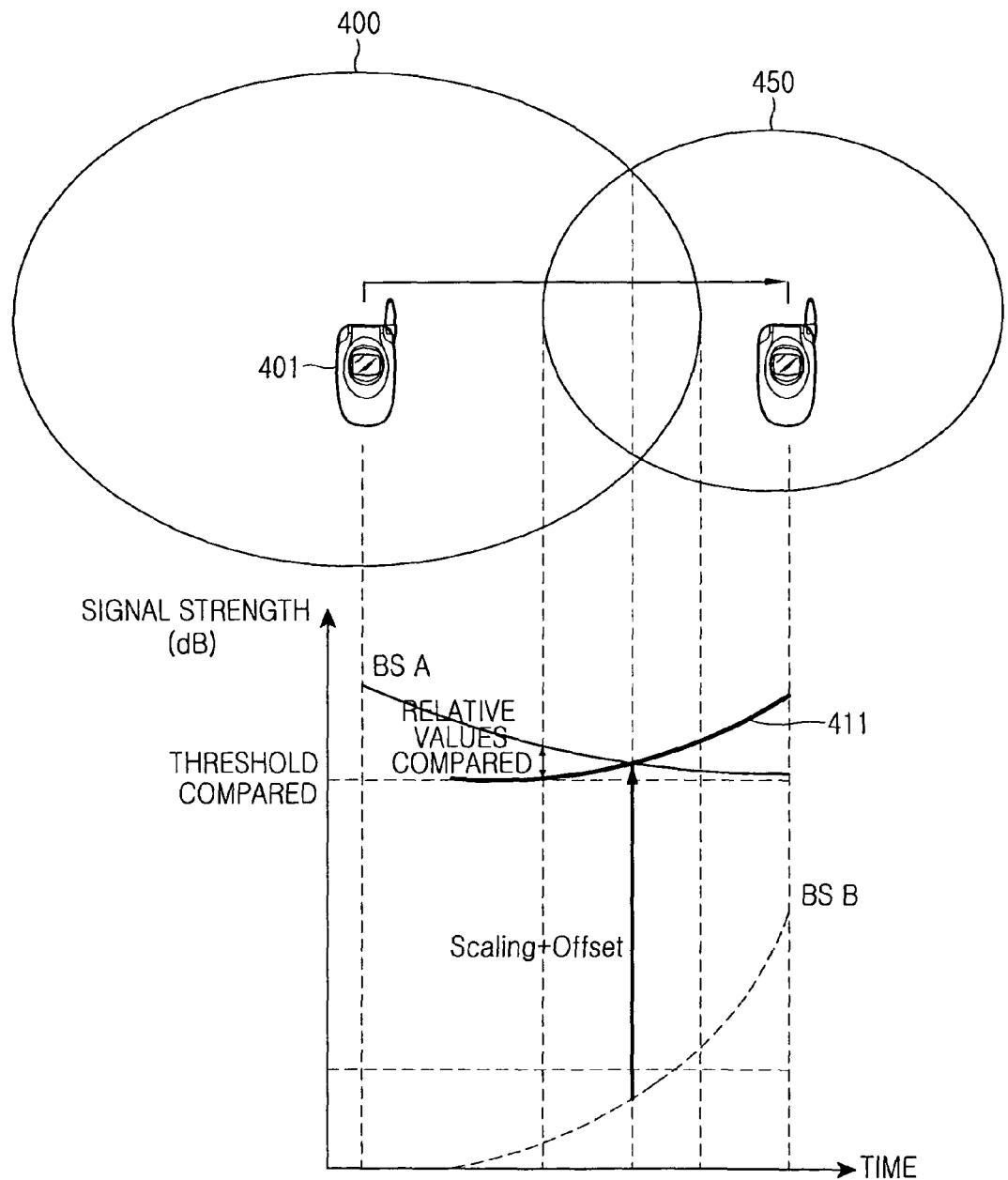
FIGS. 4A and 4B are diagrams illustrating a method for compensating signal strengths of BSs received at an MS using a scaling factor and an offset according to another embodiment of the present invention.
Figure 4B:
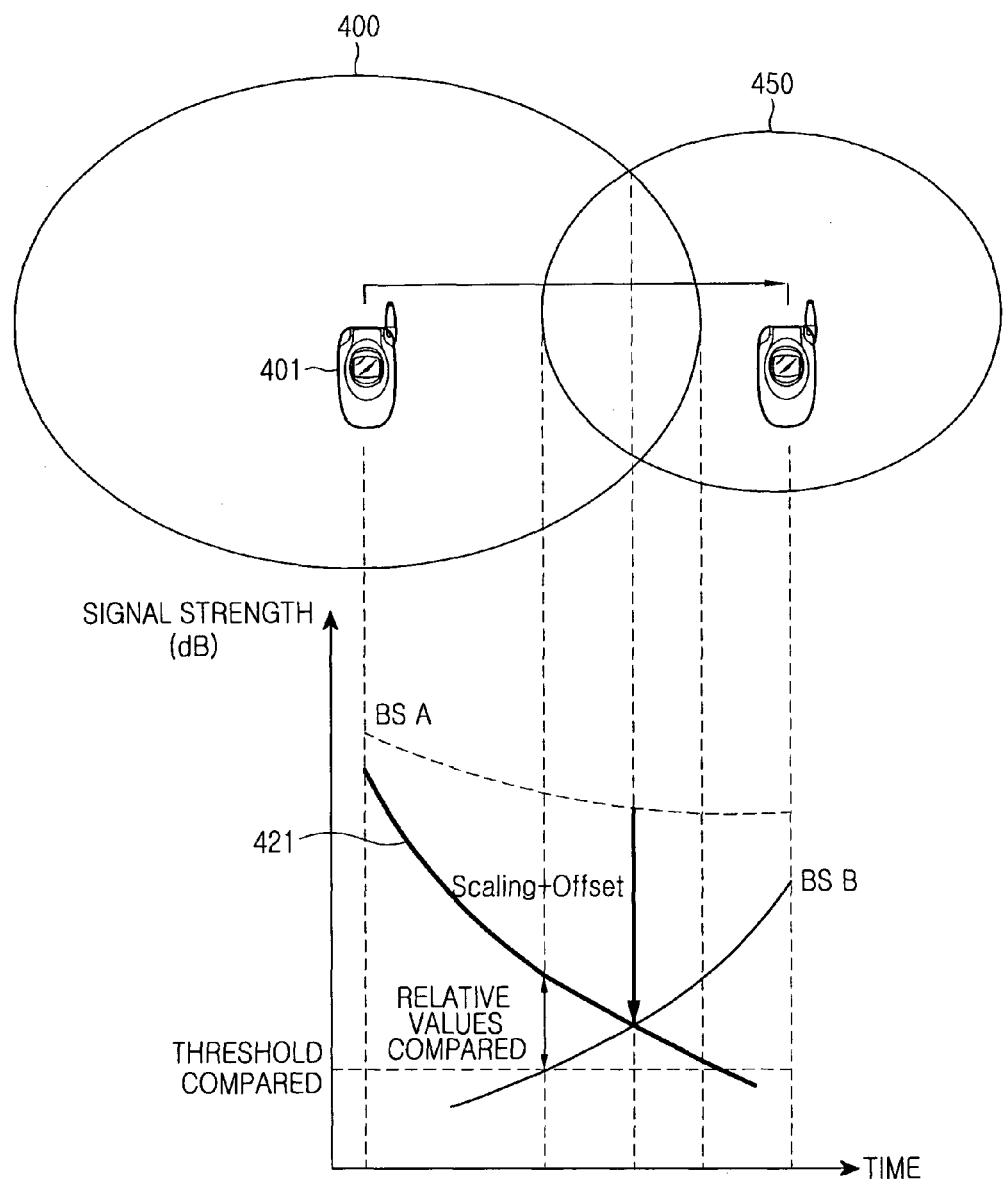

FIGS. 4A and 4B are diagrams illustrating a method for compensating signal strengths of BSs received at an MS using a scaling factor and an offset according to the present invention.

Referring to FIG. 4A, cells of a BS A and a BS B using different communication schemes are shown. Specifically, a cell A 400, which is service coverage of the BS A, and a cell B 450, which is service coverage of the BS B, are shown. In FIG. 4A, an MS 401 moves from the cell A 400 to the cell B 450, and the signal strengths received at the MS 401 are shown overtime.

The MS 401, as its location changes, should occasionally change a serving BS, i.e. should perform handoff. However, because the BS A and the BS B use different communication schemes, the MS 401 cannot apply the handoff method used in the existing single communication system. Therefore, the present invention compensates the signal strengths received from the BSs using a scaling factor and an offset in order to determine whether to perform handoff of the MS 401.

The signal strengths of the BS A using a first communication scheme and the BS B using a second communication scheme are shown in FIG. 4A. Signal strength 411 determined by compensating the signal strength of the BS B using a scaling factor and an offset is shown for comparison between signal strengths of BSs in the heterogeneous communication system.

The MS 401, as its location changes, should occasionally perform a handoff operation of changing a serving BS. However, because the BS A and the BS B use different communication schemes, the MS 401 cannot apply the handoff method used in the existing single communication system. Therefore, the present invention compensates the signal strengths received from the BSs using a scaling factor and an offset in order to determine whether to perform handoff of the MS 401.

The handoff method of FIG. 4B compensates the signal strength of the BS A, compared with the handoff method of FIG. 4A that compensates the signal of the BS B. For convenience, the details described in connection with FIG. 4A will be omitted herein. FIG. 4B, unlike FIG. 4A, shows a method for determining whether to perform handoff after applying a scaling factor and an offset to the signal strength of the BS A in order to determine whether to perform handoff between heterogeneous communication systems. The signal strengths of the BS A using a first communication scheme and the BS B using a second communication scheme are shown. Signal strength 421 determined by compensating the signal strength of the BS A using a scaling factor and an offset is shown for comparison between signal strengths of BSs in the heterogeneous communication system.

With the use of the signal strengths 411 and 421 compensated in the methods of FIGS. 4A and 4B, respectively, it is possible to determine whether to perform handoff of the MS 401.

The scaling factor in FIGS. 4A and 4B is a factor for changing a slope of signal strength of each BS. That is, the scaling factor is a factor determined according to a ratio of a reference signal strength to a BS signal strength to be compensated. Thus, the scaling factor can be determined according to a ratio of a reference signal strength set for signal strength compensation between the BSs using different communication schemes, to the signal strength of the BS, which is to be subject to signal strength compensation. The reference signal strength, as shown in FIGS. 4A and 4B, can be set as the signal strength of the serving BS or the neighbor BS. A predetermined reference signal strength can also be set as the reference signal strength, In addition the scaling factor, like the offset, can be determined using the value measured through handoff simulation or actual experiments. The scaling factor can also be set in any different manner according to the communication scheme in order to determine whether to perform handoff of the MS, and can be determined using the parameters shown in Equation (1).

Therefore, a method for determining whether to perform handoff using both the scaling factor and the offset for the signal strengths is represented in Equation (5) by $$\text{Compensated\_Pilot\_Strength}_{BS} = \text{Pilot\_Strength}_{BS} \times \text{Scaling\_Factor}_{BS_{SYS}} + \text{Offset}_{BS_{SYS}} \quad (5)$$

In Equation (5), Pilot_Strength$_{BS}$ denotes the pilot strength that the MS 401 received from a particular BS, Scaling_Factor$_{BS_{SYS}}$ denotes a scaling factor multiplied by the Pilot_Strength$_{BS}$ for signal strength compensation for the particular BS, and Offset$_{BS_{SYS}}$ denotes an offset added to the Pilot_Strength$_{BS}$ for the signal strength compensation. Therefore, the Compensated_Pilot_Strength$_{BS}$ denotes the compensated signal strength for the particular BS.

The particular BS of FIG. 4A is the BS A, and the particular BS of FIG. 4B is the BS B. Although the handoff methods of FIGS. 4A and 4B each have compensated only one BS signal strength, they can also determine whether to perform handoff by compensating the signal strengths of both the BS A and the BS B using Equation (5).

Therefore, the handoff methods of FIGS. 4A and 4B compensate signal strengths of the BS B and the BS A, and determine whether to perform handoff between heterogeneous communication systems using the compensated signal strengths 411 and 421, respectively. With the use of the compensated signal strengths, it is possible to perform handoff using the handoff decision method used in the existing single communication system.

Generally, the path loss is in proportion to log (d$^2$) as shown in Equation (1). In this case, a slope of the graph of the signal strengths is not changed. Therefore, it is possible to determine whether to perform handoff using an offset, as shown in FIGS. 3A and 3B.

However, the path loss can be in proportion to log (d$^n$) rather than in proportion to log (d$^2$) as shown in Equation (1). When the value 'n' is changed, a slope of the graph of the signal strengths is also changed. Therefore, it is possible to determine whether to perform handoff using not only the offset but also the scaling factor determined considering the slope, as shown in FIGS. 4A and 4B.

Although the above-described handoff decision methods of FIGS. 3A to 4B have been applied to the handoff from one BS using a first communication scheme to another BS using a second communication scheme due to the movement of an MS, the same can also be applied to every communication system in which the communication schemes other than the first and second communication schemes coexist.

When the MS performs handoff in the heterogeneous communication system in this manner, the MS compensates the signals received from the BSs using one reference signal strength. The reference signal strength may include a set reference signal strength, signal strength of the serving BS (for example, BS A), and signal strength of the neighbor BS (for example, BS B).

The handoff decision is performed by a handoff controller, and the handoff controller can be (i) included in the MS to allow the MS to determine whether to perform handoff, (ii) included in the BS or a base station controller to determine whether to perform handoff, or (iii) separately constructed to determine whether to perform handoff.

Figure 5:
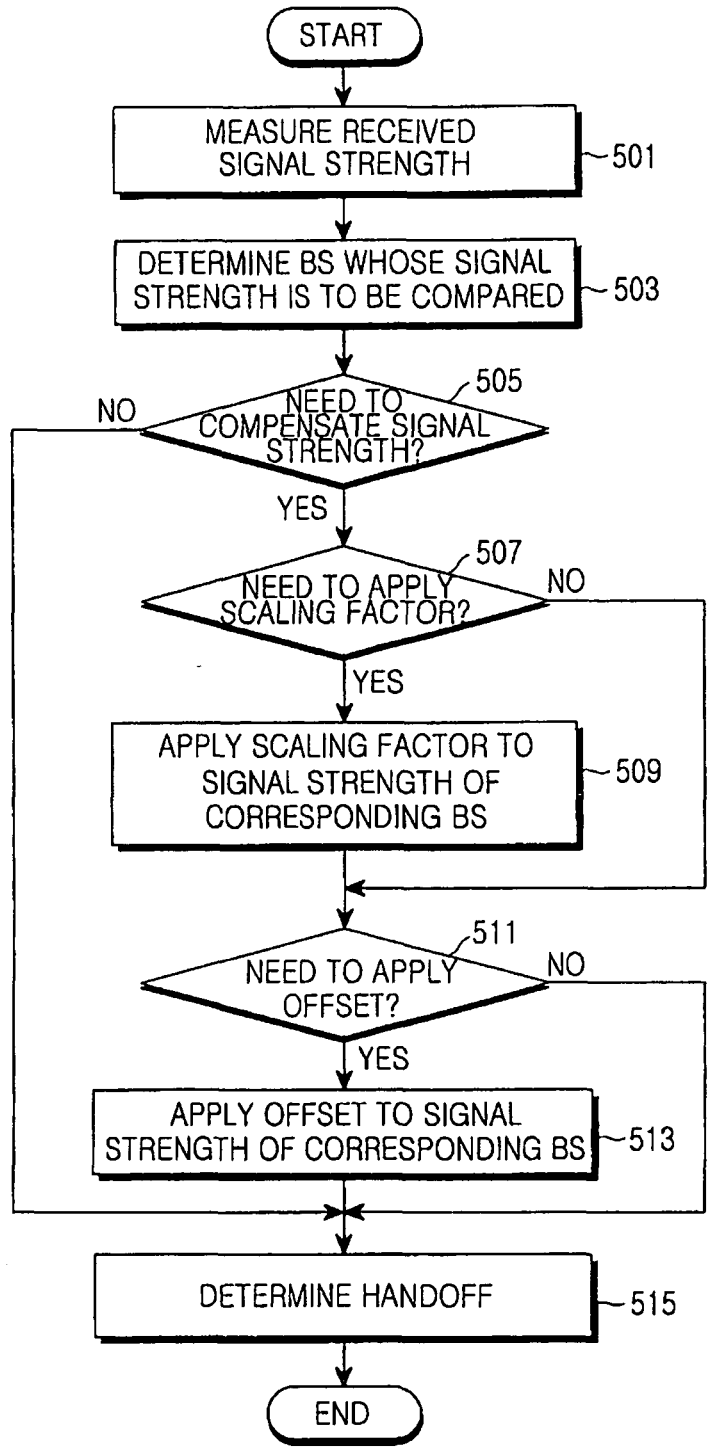
FIG. 5 is a flowchart illustrating a handoff decision process according to the present invention.

FIG. 5 is a flowchart illustrating a handoff decision process according to the present invention.

Referring to FIG. 5, in step 501, a handoff controller measures received signal strengths. The operation of the handoff controller in step 501 is for the case where the handoff controller is included in an MS. In this case, the handoff controller can directly measure the signals received at the MS from BSs. If the handoff controller is not included in the MS, it should receive measured signal strength information from the MS.

In step 503, the handoff controller selects a BS for which the signal strength is to be compensated, in order to determine handoff. The handoff controller can select more than one BS for which the signal strength is to be compensated, or can compensate signal strengths of all BSs. For the signal strength compensation, the handoff controller applies a scaling factor or an offset to the signal strengths. The scaling factor and the offset enable to compensate signal strengths of the BSs using different communication schemes, and determine whether to perform handoff depending on the compensated signal strengths.

In step 505, the handoff controller determines whether to compensate the signal strengths according to the selection of the BS for which the signal strength is to be compensated. If it is determined that there is no need to compensate the signal strengths because there is no selected BS for which the signal strength is to be compensated, the handoff controller proceeds to step 515. In this case, all BSs for determining whether to perform handoff use the same communication scheme. Because there is no need to compensate the BS signal strengths received at the MS for handoff decision between the BSs using the same communication scheme, the handoff controller can determine handoff using the existing handoff decision method. However, if it is determined that there is any selected BS whose signal strength is to be compensated, the handoff controller proceeds to step 507 as it should perform signal strength compensation.

In step 507, the handoff controller determines whether to apply a scaling factor to the signal strength of the BS, which is to be subject to signal strength compensation. If the handoff controller determines not to apply the scaling factor, it proceeds to step 511. However, if the handoff controller determines to apply the scaling factor, it proceeds to step 509. The scaling factor allows a change in a slope of a graph of the BS signal strength received at the MS.

In step 509, the handoff controller applies the scaling factor to the signal strength of the corresponding BS.

In step 511, the handoff controller determines whether to apply an offset to the signal strength of the BS, which is to be subject to signal strength compensation. If the handoff controller determines not to apply the offset, it proceeds to step 515. However, if the handoff controller determines to apply the offset, it proceeds to step 513. The offset allows a change in a level of the BS signal strength received at the MS. In addition, the scaling factor and the offset can be a real number including all of a positive (+) value, a negative (−) value, and zero (0).

In step 515, the handoff controller can determine handoff of the MS using the signals received from neighbor BSs of the MS.

The handoff decision operation of the handoff controller has been described so far with reference to FIG. 5. A detailed description will now be made of a handoff decision operation according to position of the handoff controller.

First Embodiment

Figure 6:
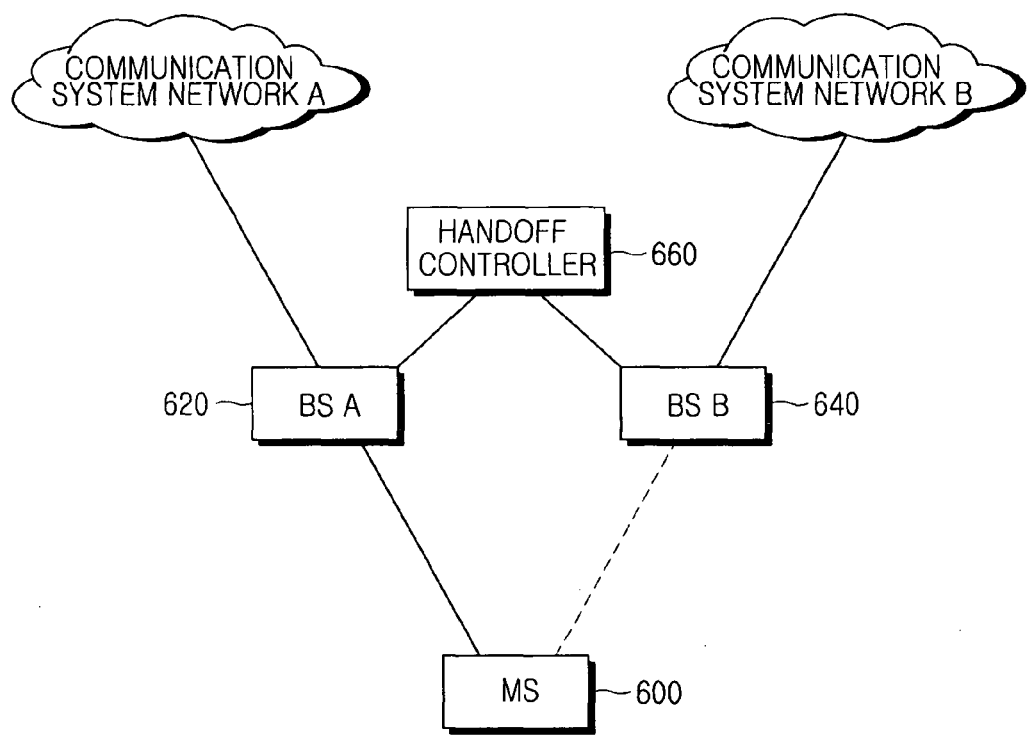
FIG. 6 is a diagram illustrating a system configuration for performing a handoff operation between heterogeneous communication systems according to the present invention.

FIG. 6 is a diagram illustrating a system configuration for performing a handoff operation between heterogeneous communication systems according to the present invention.

Before a description of FIG. 6 is given, it should be noted that a handoff controller according to the present invention determines handoff in a BS (alternatively, the handoff controller can be included in a base station controller, or can be separately implemented) regardless of whether communication schemes in use are equal to or different from each other. Therefore, the handoff controller is a function block implemented by hardware or software. In addition, the handoff controller includes storing the scaling factor and the offset proposed by the present invention, and using them for handoff decision.

Referring to FIG. 6, a BS A 620 is connected to a communication system network A using a communication scheme A, and a BS B 640 is connected to a communication system network B using a communication scheme B. It is assumed that an MS 600 is now communicating with the BS A 620, which is a serving BS. The BS A 620 and the BS B 640 are replaceable by routers.

A handoff controller 660 stores the scaling factor and the offset in a memory to determine handoff according to the present invention. Alternatively, the handoff controller 660 can receive the scaling factor and the offset via the MS 600. The handoff controller 660 receives signal strengths of BSs, periodically measured by the MS 600, via a serving BS of the MS 600, i.e. the BS A 620.

The handoff controller 660 uses the signal strengths measured by the MS 600. In the heterogeneous communication system, the handoff controller 660 determines handoff of the MS 600 by compensating the signal strengths. To determine handoff of the MS 600, the handoff controller 660 compensates the signal strengths using the scaling factor or the offset.

When the MS 600 changes its service access point to a target BS, i.e. the BS B 640, the handoff controller 660 controls a handoff operation from the BS A 620 to the BS B 640.

The handoff controller 660 can be located between communication systems using different communication schemes, for handoff in the heterogeneous communication system. Alternatively, the handoff controller 660 can be located in a base station controller controlling BSs, can be implemented in each BS, or can be located between a wireless network and the BS. The handoff controller 660 can be implemented in various ways. For example, the handoff controller 660 can be included in a base station controller or each BS, or its function can be implemented in the base station controller and each BS.

Figure 7:
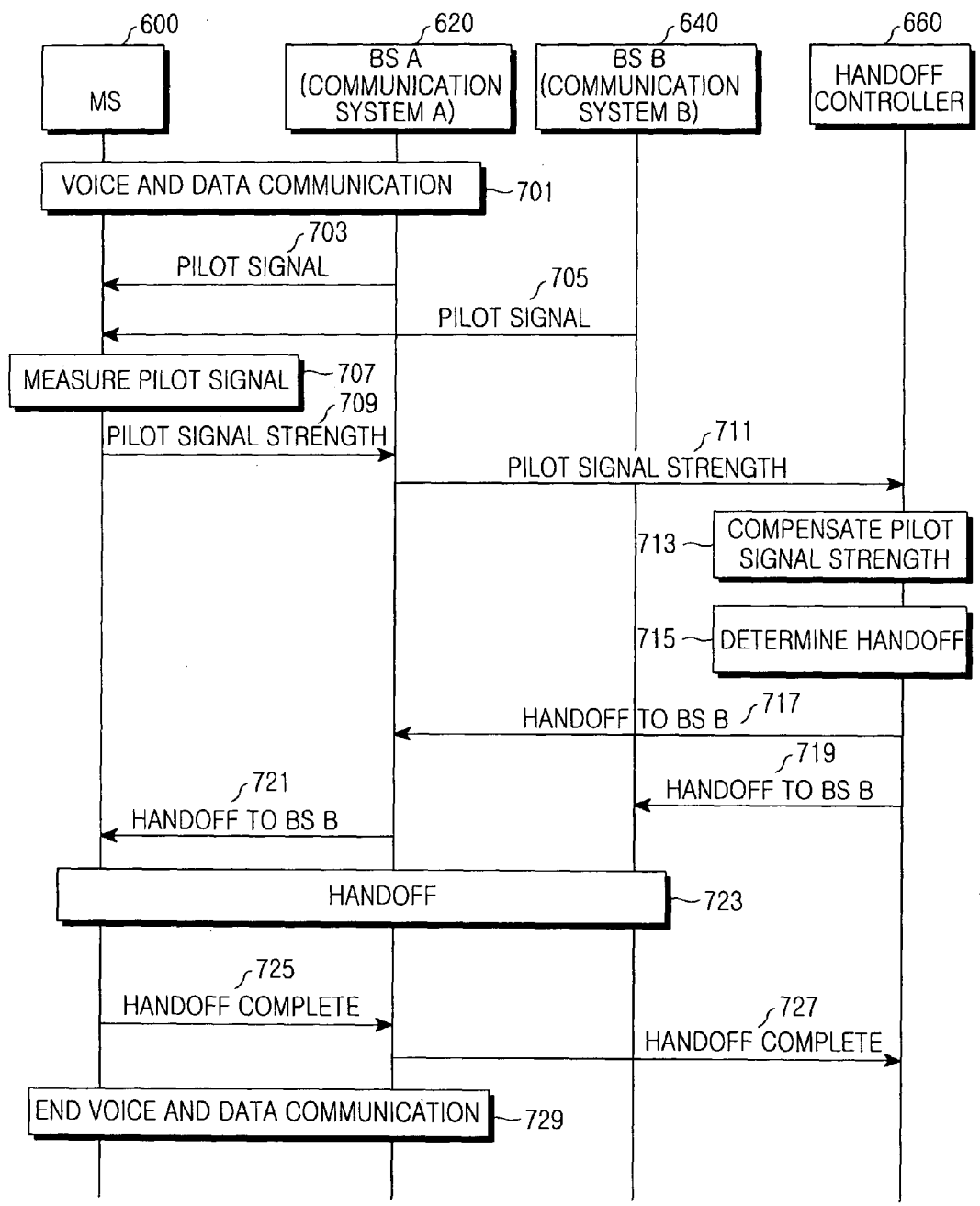
FIG. 7 is a flowchart illustrating a handoff operation process between heterogeneous communication systems according to the present invention.

FIG. 7 is a flowchart illustrating a handoff operation process between heterogeneous communication systems according to the present invention.

Referring to FIG. 7, a message transmission/reception procedure for handoff between an MS 600, a BS A 620, a BS B 640, and a handoff controller 660 is shown.

In step 701, the MS 600 performs voice and data communication with the BS A 620, which is a serving BS. The MS 600 can receive signals, for example, pilot signals, from the BS A 620 and the BS B 640. In step 703, the MS 600 receives a pilot signal transmitted from the BS A 620. In step 705, the MS 600 receives a pilot signal transmitted from the BS B 640.

In step 707, the MS 600 measures strengths of the pilot signals received from the BSs. Herein, the MS 600 periodically receives a signal from each BS and measures strength of the received signal.

In step 709, if a serving BS of the MS 600 is the BS A 620, the MS 600 transmits the signal measurement result to the BS A 620. In step 711, the BS A 620 transmits the signal measurement result to the handoff controller 660.

In step 713, the handoff controller 660 compensates the signal strengths of the BSs, measured by the MS 600, using the scaling factor or the offset. In step 715, the handoff controller 660 determines handoff of the MS 600. The handoff decision operation of the handoff controller 660 has been described with reference to FIG. 5.

In step 717, if the handoff controller 660 determines the BS B 640 as a target BS as a result of the handoff decision, the handoff controller 660 sends to the BS A 620 a notification message indicating that it will perform handoff to the BS B 640.

In step 719, the handoff controller 660 sends to the BS B 640 a handoff message indicating that the MS 600 will perform handoff to the BS B 640.

In step 721, the BS A 620 sends to the MS 600 a notification indicating the need to perform handoff to the BS B 640.

In step 723, the MS 600 performs handoff from the BS A 620, to the BS B 640. After successfully performing the handoff, the MS 600 sends a notification indicating handoff completion to the BS A 620 in step 725.

Upon receipt of the handoff complete notification from the MS 600, the BS A 620 sends a handoff complete report to the handoff controller 660 in step 727. Upon recognizing the handoff completion, the BS A 620 ends the voice and data communication with the MS 600 in step 729.

In FIG. 7, the MS 600 sends the handoff complete report to the handoff controller 660 via the BS A 620. However, it is also possible that the BS A 620 sends the handoff complete report to the handoff controller 660 via the BS B 640.

Figure 8:
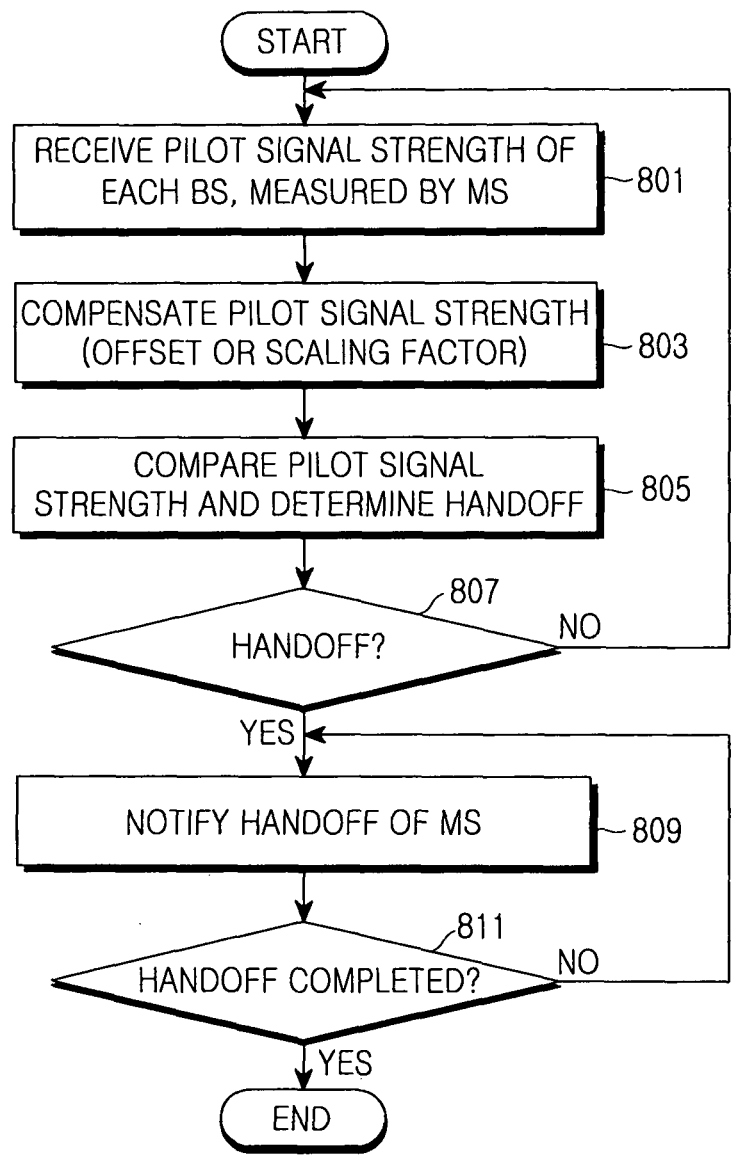
FIG. 8 is a flowchart illustrating an operation of a handoff controller according to the present invention.

FIG. 8 is a flowchart illustrating an operation of a handoff controller according to the present invention.

Referring to FIG. 8, in step 801, the handoff controller receives signal strengths of BSs, measured by an MS.

In step 803, the handoff controller compensates the pilot signal strengths to determine handoff of the MS. As described in connection with FIG. 5, the handoff controller uses an offset or a scaling factor for compensation of the pilot signal strengths. The handoff controller determines a reference signal strength for signal strength compensation, and selects a BS for which a signal strength is to be compensated, depending on the determined reference signal strength. For example, if the determined reference signal strength is the signal strength of a BS A, the handoff controller determines a BS B as a BS for which signal strength is to be compensated. If the determined reference signal strength is the signal strength of the BS B, the handoff controller determines the BS A as a BS for which signal strength is to be compensated. If the determined reference signal strength is predetermined, the handoff controller selects both the BS A and the BS B as BSs whose signal strengths are to be compensated.

In step 805, the handoff controller compares the compensated signal strengths, and determines handoff of the MS depending on the comparison result. The handoff controller can determine handoff even in the heterogeneous communication system through the comparison of the pilot signal strengths compensated in step 803.

In step 807, the handoff controller determines whether the MS will now perform handoff according to the handoff decision. If the handoff controller determines not to allow the MS to perform handoff, the handoff controller proceeds to step 801. However, if the handoff controller determines to allow the MS to perform handoff, the handoff controller proceeds to step 809.

In step 809, the handoff controller sends a notification indicating handoff of the MS to a serving BS and a target BS. The target BS is determined by the handoff controller by compensating the pilot signal strength of the BS.

In step 811, the handoff controller determines whether the handoff is completed. Upon failure to receive a handoff complete message from the serving BS or the target BS, the handoff controller proceeds to step 809. However, upon receipt of the handoff complete message, the handoff controller ends the handoff process.

The handoff method can perform handoff even in the heterogeneous communication system by compensating the signal strengths received at the MS between the BSs using different communication schemes, and determining whether to perform handoff depending on the compensated signal strengths.

For example, the handoff controller can be constructed in a base station controller or a BS, or can be separately constructed. The handoff controller controls an operation of determining handoff by compensating pilot signal strengths of the BSs, received at the MS, and performing handoff according to the handoff decision.

Second Embodiment

Figure 9:
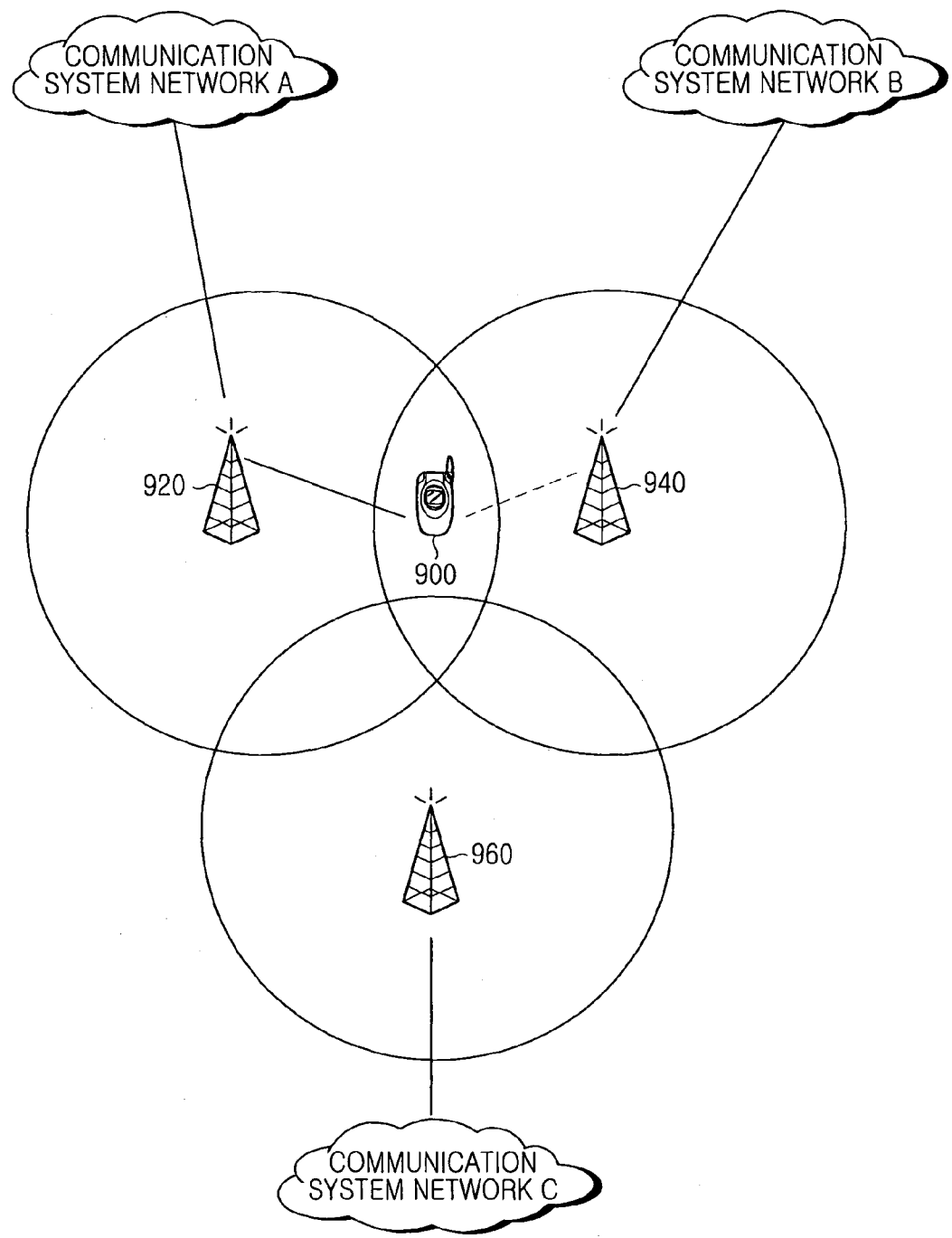
FIG. 9 is a diagram illustrating a system configuration for performing a handoff operation between heterogeneous communication systems according to the present invention.

FIG. 9 is a diagram illustrating a system configuration for performing a handoff operation between heterogeneous communication systems according to the present invention.

Before a description of FIG. 9 is given, it should be noted that a handoff controller is included in an MS or implemented by software through the MS, and the handoff controller stores a scaling factor and an offset for compensation of a difference between signal strengths of BSs using different communication schemes, and determines handoff using the scaling factor and the offset.

Referring to FIG. 9, a BS A 920 is connected to a communication system network A using a communication scheme A, a BS B 940 is connected to a communication system network B using a communication scheme B, and a BS C 960 is connected to a communication system network C using a communication scheme C. It is assumed that an MS 900 is now communicating with the BS A 920, which is a serving BS.

The MS 900 receives signals of BSs 920, 940 and 960, and measures strengths of the received signals at stated intervals. The MS 900 determines a reference signal strength for enabling comparison of the signals, compensates the determined signal strengths of the BSs 920, 940 and 960, and then determines whether to perform handoff.

A detailed description of the above operation will be made with reference to FIG. 10, assuming that a serving BS of the MS 900 is the BS A 920, and the MS 900 determines the BS B 940 as a target BS through compensation of the pilot signal strengths received from the BSs, and performs handoff to the BS B 940.

Figure 10:
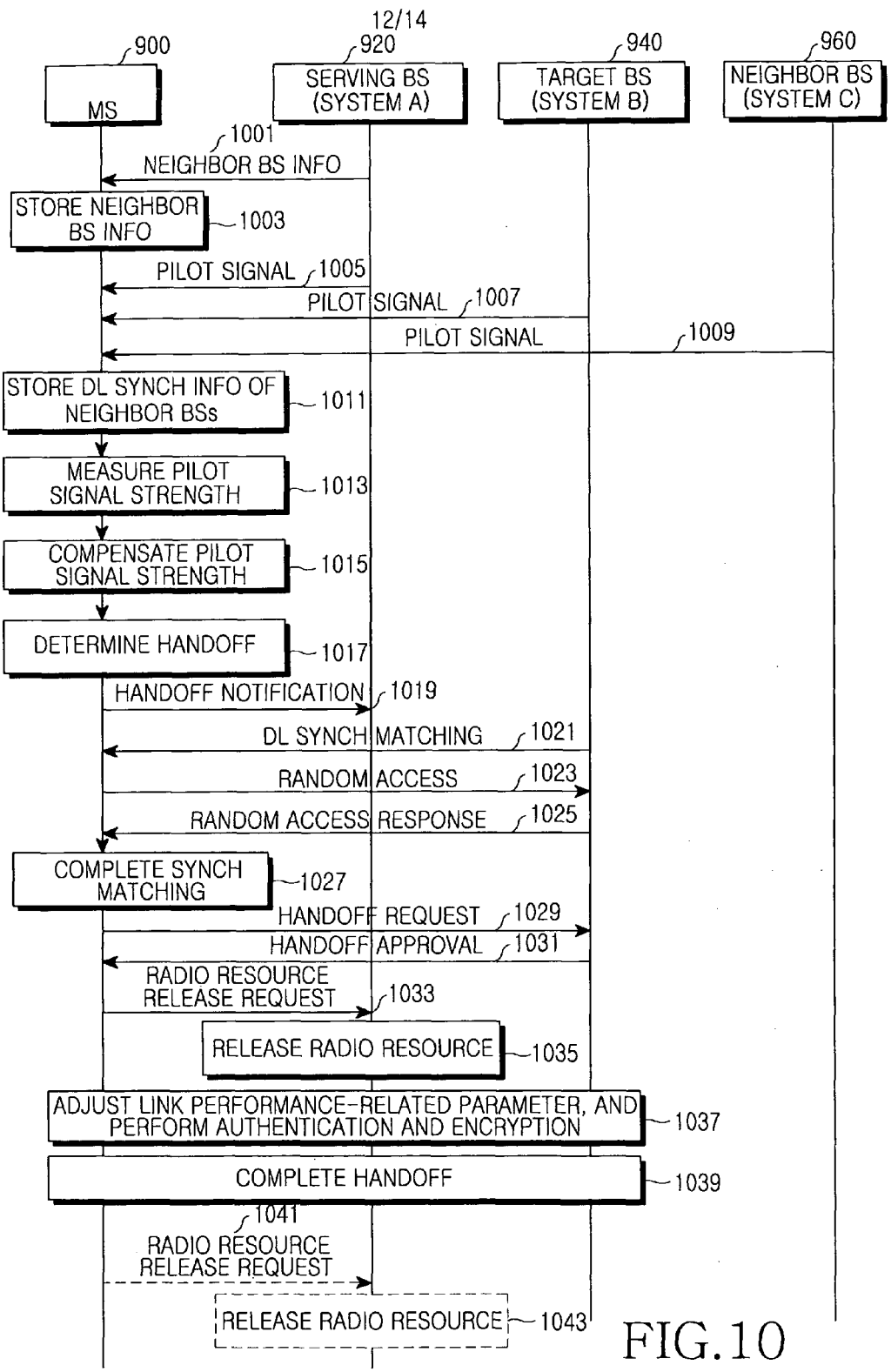
FIG. 10 is a flowchart illustrating a handoff operation process between heterogeneous communication systems according to the present invention.

FIG. 10 is a flowchart illustrating a handoff operation process between heterogeneous communication systems according to the present invention.

Referring to FIG. 10, a message transmission/reception procedure for handoff between MS 900, a BS A 920, a BS B 940, and a BS C 960 is shown.

In step 1001, the MS 900 is performing communication with the BS A 920, and receives neighbor BS information from the serving BS A 920. In step 1003, the MS 900 stores information on neighbor BSs, i.e. the BS B 940 and the BS C 960. Next, in steps 1005, 1007 and 1009, the MS 900 receives signals, for example, pilot signals, from the serving BS and the neighbor BSs, i.e. the BS A 920, the BS B 940 and the BS C 960.

In step 1011, the MS 900 receiving the pilot signals, periodically tracks downlink synchronization information of the neighbor BSs and stores the tracked information. In step 1013, the MS 900 measures strengths of the received pilot signals, and compensates the measured pilot signal strengths. Herein, the compensation of the pilot signal strengths by the MS 900 determines a reference signal for pilot signal compensation, and determines a BS for which signal strength is to be compensated, according to the determined reference signal. In step 1015, the MS 900 compensates pilot signal strength of the determined BS. The MS 900 can compensate the pilot signal strengths using the scaling factor or the offset described in FIG. 5. In step 1017, the MS 900 determines handoff of the MS 900. In step 1019, if a determined target BS is the BS B 940, the MS 900 sends to the BS A 920 a notification indicating that it will perform handoff to the BS B 940.

The MS 900 is allocated, from the BS A 920, an interval in which there is no data transmission, in order to match downlink and uplink synchronization with the BS B 940. In addition, the MS 900 is allocated an interval in which there is no data transmission, for handoff decision.

Further, the MS 900 matches downlink and uplink synchronization with the target BS, i.e. BS B 940, in the interval where there is no data communication with the serving BS. In step 1021, the downlink synchronization is rapidly matched using downlink synchronization information stored in the MS 900. In step 1023, the MS 900 matches the uplink synchronization through a random access process, and performs a random access to the BS B 940 using the neighbor BS information stored therein.

In step 1025, the BS B 940 sends a response message in response to the random access of the MS 900. In step 1027, the MS 900 completes synchronization matching with the BS B 940 through the above procedure for matching uplink and downlink synchronization.

In step 1029, after completion of the synchronization matching, the MS 900 sends a handoff request to the BS B 940. In step 1031, the BS B 940 sends a handoff approval to the MS 900 in response to the handoff request of the MS 900.

In step 1033, upon receipt of the handoff approval message, the MS 900 sends a radio resource release request to the serving BS A 920. In step 1035, the BS A 920 releases the radio bearer in response to the radio resource release request of the MS 900.

In step 1037, the MS 900 and the BS B 940 adjusts parameter values related to link performance, and performs authentication and encryption. In step 1039, if the MS 900 can communicate with the BS B 940, it performs handoff to the BS B 940, completing handoff.

In order to end communication with the serving BS A 920, the MS 900 should release the radio resource allocated thereto. There are various possible processes of releasing the radio resources, and a description thereof will be made below.

Although the operation in which the MS 900 and the BS A 920 release the radio resources is performed in steps 1033 and 1035, it is also possible to perform the operation after the handoff is completed in step 1039.

Figure 11A:
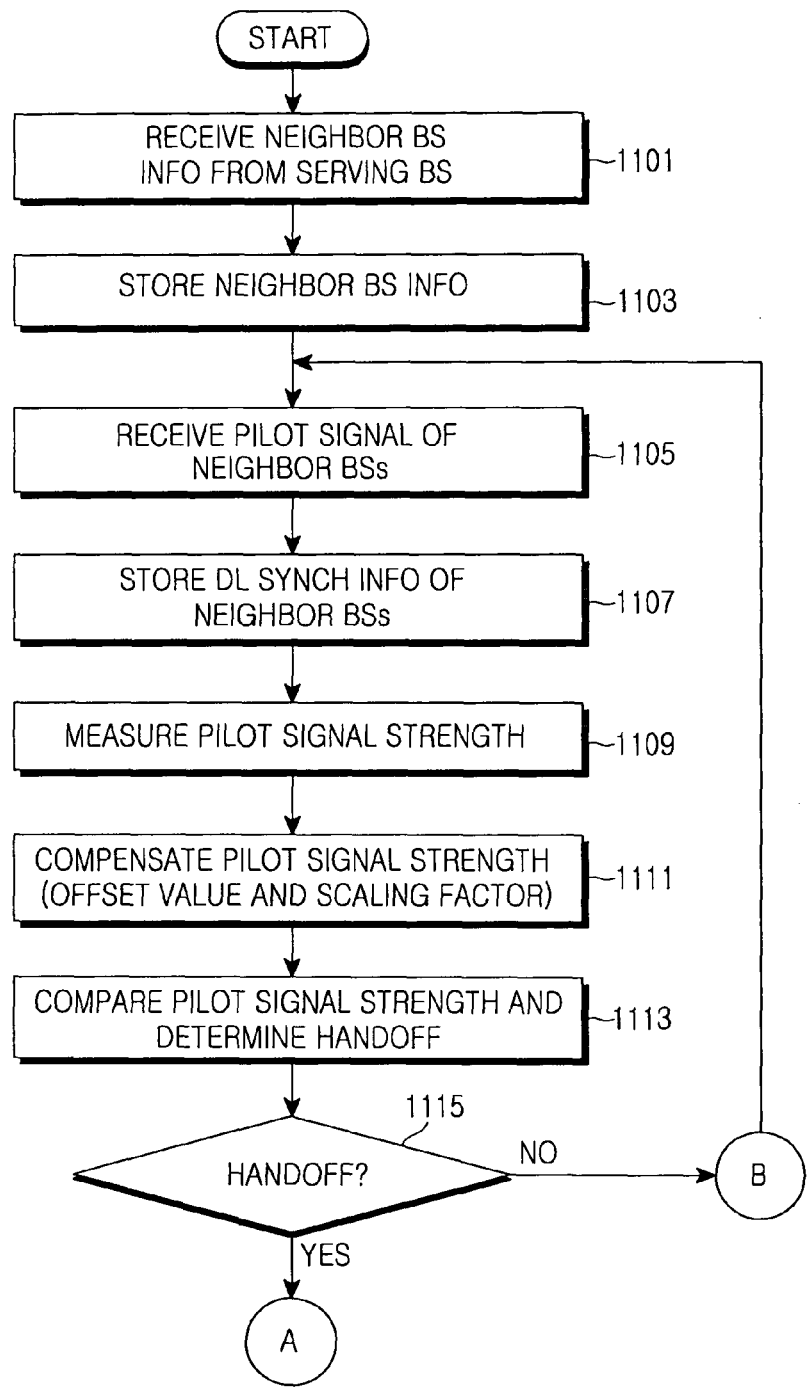
FIGS. 11A and 11B are flowcharts illustrating an operation of an MS when handoff is performed between heterogeneous communication systems according to the present invention.
Figure 11B:
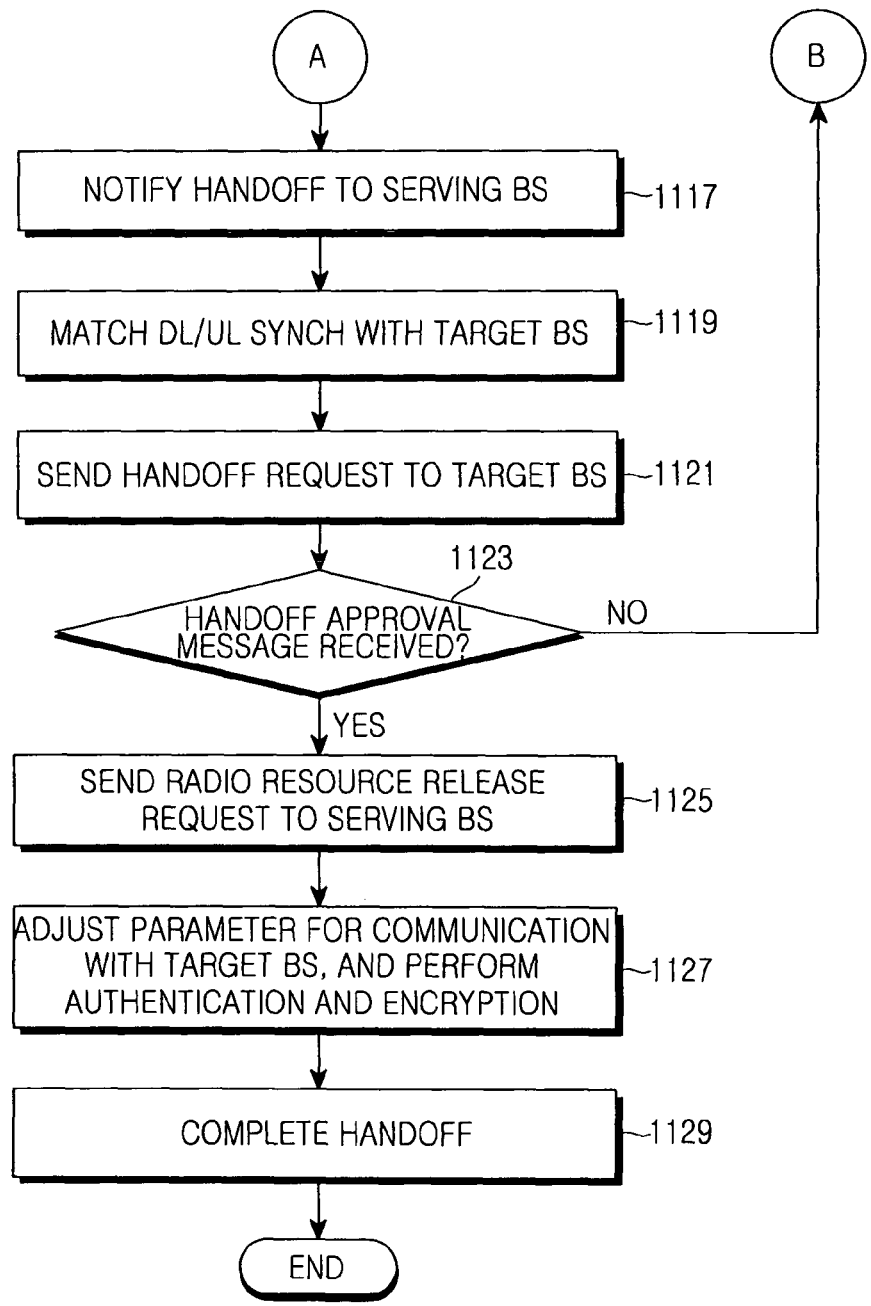

FIGS. 11A and 11B are flowcharts illustrating an operation of an MS when handoff is performed between heterogeneous communication systems according to the present invention.

Referring to FIG. 11A, in step 1101, the MS receives information on neighbor BSs from a serving BS that is providing service to the MS. In step 1103, the MS stores the neighbor BS information received from the serving BS.

In step 1105, the MS receives signals, for example, pilot signals, from the neighbor BSs. The signals that the MS receives include signals from all of the serving BS and the neighbor BSs.

In step 1107, the MS periodically stores downlink synchronization information of the neighbor BSs. The MS can periodically store the downlink synchronization information by periodically receiving the pilot signals. In step 1109, the MS periodically measures the downlink synchronization information of the neighbor BSs.

In step 1111, the MS compensates the measured pilot signal strengths of the BSs, for further comparison. The MS can compensate the pilot signal strengths using the scaling factor and the offset.

If a reference signal strength for the pilot signal comparison is a signal strength of the BS A, the MS compensates signals of the BS B and the BS C. If the reference signal strength is a signal strength of the BS B, the MS compensates signals of the BS A and the BS C. If the reference signal strength is a signal of the BS C, the MS compensates signals of the BS A and the BS B. If the reference signal strength is predetermined, the MS compensates signals from all of the BS A, the BS B, and the BS C. The MS uses the scaling factor and the offset in compensating the pilot signals.

In step 1113, the MS compares the compensated pilot signals of the BSs with each other, and determines handoff of the MS if there is a need for handoff of the MS as a result of the comparison. The MS determines the target BS as well.

In step 1115, the MS determines whether to perform handoff If the MS determines not to perform handoff, it returns to step 1105. However, if the MS determines to perform handoff, it proceeds to step 1117.

Referring to FIG. 11B, in step 1117, the MS sends, to the serving BS, a handoff notification indicating that it will perform handoff to the target BS, i.e. the BS B.

In step 1119, the MS matches downlink and uplink synchronizations with the target BS.

In step 1121, after completion of the synchronization matching, the MS sends a handoff request to the target BS.

In step 1123, the MS determines whether it has received a handoff approval message from the target BS in response to the handoff request message. If the MS has failed to receive the handoff approval message, the MS returns to step 1105. However, if the MS has received the handoff approval message, the MS proceeds to step 1125

In step 1125, the MS sends a radio resource release request message to the serving BS. In step 1127, the MS adjusts parameter values for communication with the target BS, and performs authentication and encryption.

In step 1129, the MS completes the handoff, if it can perform handoff to the BS.

Since the second embodiment, unlike the first embodiment, performs the handoff in the MS, it can be considered that the handoff controller in the first embodiment is implemented in the MS.

In addition, the handoff method proposed in the present invention can compare signals from more than two BSs, for handoff decision, and compensates the BS signal strengths received at the MS using a predetermined reference signal strength. The handoff method determines whether to perform handoff by performing the signal compensation using the scaling factor and the offset.

As can be understood from the foregoing description, when handoff is performed in a communication system using different communication schemes, i.e. a heterogeneous communication system, the proposed handoff off method determines whether to perform handoff by compensating the BS signal strengths received at the MS, thereby enabling handoff of the MS in the heterogeneous communication system. As a result, the handoff method can virtually ensure seamless data transmission/reception even in the heterogeneous communication system regardless of the handoff of the MS.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for performing handoff between heterogeneous communication systems, the method comprising the steps of:
   compensating one of a first signal strength and a second signal strength, received at a Mobile Station (MS), by using a multiplication of a signal strength to be compensated and a scaling factor, and an offset; and
   determining whether to perform a handoff of the MS using the compensated signal strength,
   wherein the signal strength to be compensated is one of the first signal strength and the second signal strength, the first signal strength is measured from a first signal received from a first base station (BS) using a first communication scheme, the second signal strength is measured from a second signal received from a second BS using a second communication scheme, and the first communication scheme is different from the second communication scheme,
   wherein the scaling factor is determined according to a ratio of a reference signal strength to the signal strength to be compensated, and
   wherein the reference signal strength is one of a predetermined signal strength, the first signal strength, and the second signal strength.

2. The method of claim 1, wherein each of the first signal strength and the second signal strength is determined by measuring a power value for each of the first signal and the second signal, received at the MS,
   wherein each of the first signal and the second signal includes at least one of a pilot signal and a preamble signal.

3. The method of claim 2, wherein the power value is one of a Received Signal Strength (RSS) value and a Signal to Interference and Noise Ratio (SINR) value.

4. The method of claim 1, wherein the compensated signal strength is calculated using $$\text{Compensated\_Signal\_Strength}_{BS} = \text{Signal\_Strength}_{BS} + \text{Offset}_{BS_{SYS}}$$

where Compensated_Signal_Strength$_{BS}$ denotes the compensated signal strength, Signal_Strength$_{BS}$ denotes the signal strength to be compensated, received at the MS, and Offset$_{BS_{SYS}}$ denotes an offset for signal compensation for a particular BS, the particular BS denotes a BS which transmitted the signal strength to be compensated among the first BS and the second BS.

5. The method of claim 1, wherein the offset is determined using parameters of a path loss equation given as $$\text{Path loss (dB)} = -10 \times \log(G_t G_r \lambda^2 / (4\pi d)^2)$$

where $G_t$ denotes a gain of a transmission antenna, $G_r$ denotes a gain of a reception antenna, $\lambda$ denotes a wavelength at the center frequency, and 'd' denotes a distance between a transmitter and a receiver.

6. The method of claim 1, wherein the compensated signal strength is calculated using $$\text{Compensated\_Signal\_Strength}_{BS} = \text{Signal\_Strength}_{BS} \times \text{Scaling\_Factor}_{BS_{SYS}}$$

where Compensated_Signal_Strength$_{BS}$ denotes the compensated signal strength, Signal_Strength$_{BS}$ denotes the signal strength to be compensated among the first signal strength and the second signal strength, received at the MS, and Scaling_Factor$_{BS_{SYS}}$ denotes a scaling factor for signal compensation for the MS.

7. The method of claim 1, wherein the scaling factor is determined using parameters of a path loss equation given as $$\text{Path loss (dB)} = -10 \times \log(G_t G_r \lambda^2 / (4\pi d)^2)$$

where $G_t$ denotes a gain of a transmission antenna, $G_r$ denotes a gain of a reception antenna, $\lambda$ denotes a wavelength at the center frequency, and 'd' denotes a distance between a transmitter and a receiver.

8. The method of claim 1, wherein the compensated signal strength is calculated using $$\text{Compensated\_Signal\_Strength}_{BS} = \text{Signal\_Strength}_{BS} \times \text{Scaling\_Factor}_{BS_{SYS}} + \text{Offset}_{BS_{SYS}}$$

where Compensated_Signal_Strength$_{BS}$ denotes the compensated signal strength, Signal_Strength$_{BS}$ denotes the signal strength to be compensated among the first signal strength and the second signal strength, received at the MS, Scaling_Factor$_{BS_{SYS}}$ denotes a scaling factor for signal compensation for the particular MS, and Offset$_{BS_{SYS}}$ denotes an offset for signal compensation.

9. An apparatus for performing handoff between heterogeneous communication systems including a serving base station (BS), the apparatus comprising:

a handoff controller for compensating one of a first signal strength and a second signal strength, received at a Mobile Station (MS), by using a multiplication of a signal strength to be compensated and a scaling factor, and an offset; and determining whether to perform a handoff of the MS using the compensated signal strength, wherein the signal strength to be compensated is one of the first signal strength and the second signal strength, the first signal strength is measured from a first signal received from a first Base Station (BS) using a first communication scheme, the second signal strength is measured from a second signal received from a second BS using a second communication scheme, and the first communication scheme is different from the second communication scheme, wherein the scaling factor is determined according to a ratio of a reference signal strength to the signal strength to be compensated, and wherein the reference signal strength is one of a predetermined signal strength, the first signal strength, and the second signal strength.

10. The apparatus of claim 9, wherein each of the signal strength and the second signal strength is determined by measuring a power value for each of the first signal and the second signal, received at the MS, wherein each of the first signal and the second signal includes at least one of a pilot signal and a preamble signal.

11. The apparatus of claim 9, wherein the power value is one of a Received Signal Strength (RSS) value and a Signal to Interference and Noise Ratio (SINR) value.

12. The apparatus of claim 9, wherein the compensated signal strength is calculated using $$\text{Compensated\_Signal\_Strength}_{BS} = \text{Signal\_Strength}_{BS} + \text{Offset}_{BS_{SYS}}$$

where Compensated_Signal_Strength$_{BS}$ denotes the compensated signal strength, Signal_Strength$_{BS}$ denotes the signal strength to be compensated, received at the MS, and Offset$_{BS_{SYS}}$ denotes an offset for signal compensation for a particular BS, the particular BS denotes a BS which transmitted the signal strength to be compensated among the at least one of the first BS and the second BS.

13. The apparatus of claim 9, wherein the offset is determined using parameters of a path loss equation given as $$\text{Path loss (dB)} = -10 \times \log(G_t G_r \lambda^2 / (4\pi d)^2)$$

where $G_t$ denotes a gain of a transmission antenna, $G_r$ denotes a gain of a reception antenna, $\lambda$ denotes a wavelength at the center frequency, and 'd' denotes a distance between transmitter and a receiver.

14. The apparatus of claim 9, wherein the compensated signal strength is calculated using $$\text{Compensated\_Signal\_Strength}_{BS} = \text{Signal\_Strength}_{BS} \times \text{Scaling\_Factor}_{BS_{SYS}}$$

where Compensated_Signal_Strength$_{BS}$ denotes the compensated signal strength, Signal_Strength$_{BS}$ denotes the signal strength to be compensated among the first signal strength and the second signal strength, received at the MS, and Scaling_Factor$_{BS_{SYS}}$ denotes a scaling factor for signal compensation for the MS.

15. The apparatus of claim 9, wherein the scaling factor is determined using parameters of a path loss equation given as $$\text{Path loss (dB)} = -10 \times \log(G_t G_r \lambda^2 / (4\pi d)^2)$$

where $G_t$ denotes a gain of a transmission antenna, $G_r$ denotes a gain of a reception antenna, $\lambda$ denotes a wavelength at the center frequency, and 'd' denotes a distance between transmitter and a receiver.

16. The apparatus of claim 9, wherein the compensated signal strength is calculated using $$\text{Compensated\_Signal\_Strength}_{BS} = \text{Signal\_Strength}_{BS} \times \text{Scaling\_Factor}_{BS_{SYS}} + \text{Offset}_{BS_{SYS}}$$

where Compensated_Signal_Strength$_{BS}$ denotes the compensated signal strength, Signal_Strength$_{BS}$ denotes the signal strength to be compensated among the first signal strength and the second signal strength, received at the MS, Scaling_Factor$_{BS_{SYS}}$ denotes a scaling factor for signal compensation for the particular MS, and Offset$_{BS_{SYS}}$ denotes an offset for signal compensation.

17. The apparatus of claim 9, wherein the handoff controller is included in one of a base station controller, a BS, and an MS in the first communication system or the second communication system.

* * * * *